D. D. SULLIVAN.
DISPLAY AND VENDING APPARATUS FOR SPECTACLES.
APPLICATION FILED JUNE 20, 1914.
1,132,406.
Patented Mar. 16, 1915.
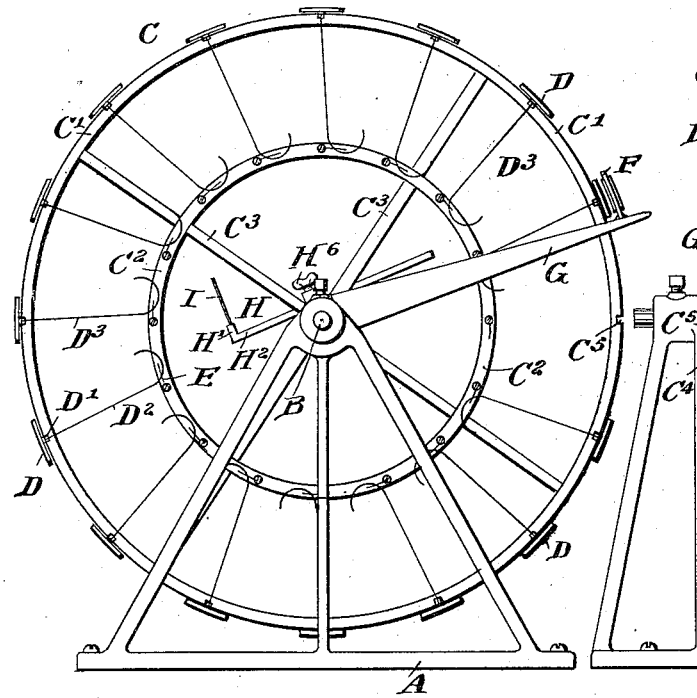
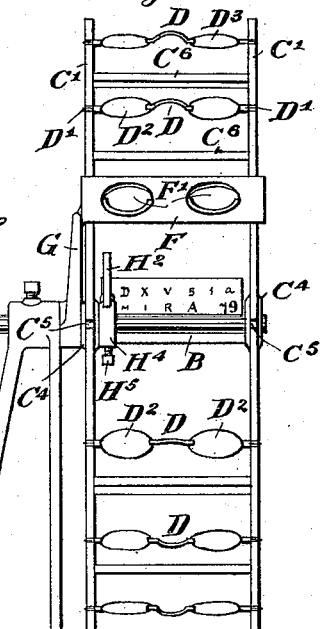
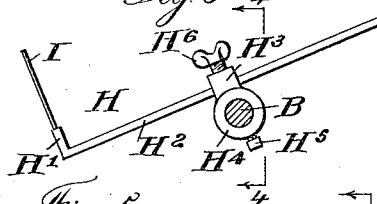
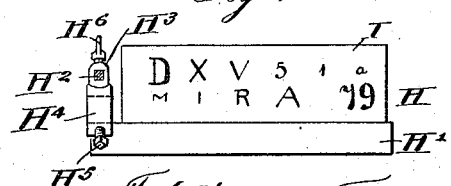
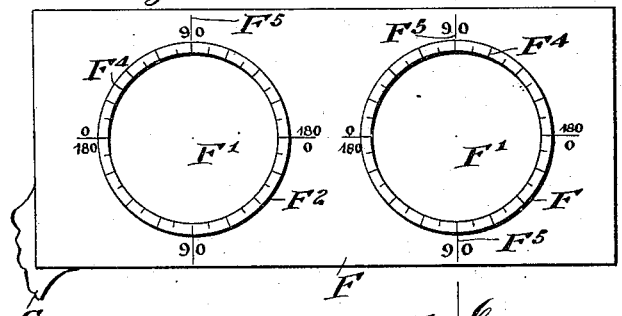
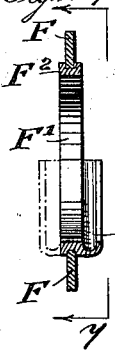
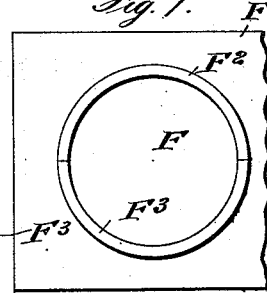
WITNESSES
Otto Fricke
INVENTOR
Daniel D. Sullivan
BY Munn & Co.
ATTORNEYS

UNITED STATES PATENT OFFICE.

DANIEL D. SULLIVAN, OF FARGO, NORTH DAKOTA.

DISPLAY AND VENDING APPARATUS FOR SPECTACLES.

1,132,406.  Specification of Letters Patent.  Patented Mar. 16, 1915.

Application filed June 20, 1914. Serial No. 846,328.

*To all whom it may concern:*

Be it known that I, DANIEL D. SULLIVAN, a citizen of the United States, and a resident of Fargo, in the county of Cass and State of North Dakota, have invented a new and Improved Display and Vending Apparatus for Spectacles, of which the following is a full, clear, and exact description.

The object of the invention is to provide a new and improved apparatus which is primarily intended for use in stores for displaying, selecting and vending spectacles, eyeglasses and similar instruments of vision and arranged to enable a customer who is without any knowledge of optics to readily select the proper instrument of vision. The apparatus is also serviceable for the use of opticians for quickly and accurately fitting persons for proper spectacles or eyeglasses.

In order to accomplish the desired result use is made of a revoluble wheel provided at its peripheral face with means for holding different spectacles, eyeglasses or like instruments of vision, a support for a test card located intermediate the peripheral face and the axis of the wheel for holding a test card, and a stationary eye-piece extending across the rim of the wheel and adapted to register with any one of the spectacles, eyeglasses or other instruments of vision on rotating a wheel, the said eye-piece and the said testing card being in the same line of vision.

A practical embodiment of the invention is represented in the accompanying drawings forming a part of this specification, in which similar characters of reference indicate corresponding parts in all the views.

Figure 1 is a side elevation of the apparatus; Fig. 2 is a front view of the same; Fig. 3 is a sectional side elevation of the test card holder; Fig. 4 is a sectional front elevation of the same on the line 4—4 of Fig. 3; Fig. 5 is an enlarged front elevation of the eye-piece; Fig. 6 is a cross section of the same on the line 6—6 of Fig. 5; and Fig. 7 is a rear face view of part of the same.

On a suitably constructed stand A is secured an axle B on which is mounted to rotate a wheel C for supporting spectacles, eyeglasses or similar instruments of vision D. The wheel C is formed of two outer rims $C'$, $C'$ and two inner rims $C^2$, the rims being spaced apart and attached to spokes $C^3$ radiating from hubs $C^4$ mounted to turn loosely on the axle B. The peripheral faces of the outer rims $C'$ are provided with notches $C^5$ for the reception of the posts $D'$ of the instruments of vision D so as to hold the same in place with the lenses $D^2$ intermediate the rims $C'$. The rims $C'$ are connected with each other intermediate the notches $C^5$ by cross bars $C^6$, as plainly indicated in Fig. 2. In case the instruments of vision D are spectacles, the temples $D^3$ thereof are extended inward and engaged by buttons E mounted on the inner rims $C^2$ so as to securely hold the instruments of vision D in position on the wheel C and with the lenses $D^2$ approximately tangential relative to the peripheral faces of the rims $C'$.

An eye-piece F having spaced openings $F'$ extends across the peripheral face of the wheel C in such a manner that the openings $F'$ register with the lenses $D^2$ of the instruments of vision D on turning the wheel C. The eye-piece F is attached to the outer end of an arm G secured to the axle B.

A holder H for supporting a test card I is mounted on the axle B in such a manner that the test card I is parallel with the eye-piece F and the lenses $D^2$ of the instruments of vision in register at the time with the eye-piece F, as will be readily understood by reference to Fig. 1. The test card holder H is provided with a socket $H'$ for the insertion of the card I, and the socket $H'$ is at one end of a rod $H^2$ mounted to slide in a lug $H^3$ forming part of a collar $H^4$ engaging the axle B and secured thereto by a set screw $H^5$. The rod $H^2$ is adapted to be fastened in place on the lug $H^3$ by a thumb screw $H^6$. On loosening the thumb screw $H^6$ the rod $H^2$ can be adjusted so as to move the test card I nearer to or farther from the eye-piece F, and when the desired adjustment has been made the rod $H^2$ is fastened in place in the lug $H^3$ by screwing up the thumb screw $H^6$.

In practice, a large number of spectacles, eyeglasses or other instruments of vision D are removably mounted on the wheel C to provide a large variety of instruments of vision having lenses of different patterns.

A customer intending to purchase an instrument of vision D places himself in front of the machine and applies his eyes to the openings $F'$ and then turns the wheel C until the instrument of vision registers with the eye-piece F through which the customer can read the text of the test card I. The customer on opening the corresponding buttons E can now remove the instrument of vision from the wheel C and the dealer can replace an instrument of vision for the one removed.

It is understood that the instruments of vision mounted on the wheel C are preferably spectacles and eyeglasses for reading and close work. In case the apparatus is to be used by opticians to enable the same to quickly and accurately fit persons with proper spectacles and eyeglasses then the eye-piece F is provided at the openings F' with turnable collars F² each provided with a semicircular holder F³ for supporting an extra testing lens. The face of each collar F² is provided with a graduation F⁴ indicating on graduation marks F⁵ arranged on the face of the eye-piece F and indicating right angles, as shown in Fig. 5. The optician by inserting the testing lenses in the holders F³ and revolving the same can readily determine astigmatism and other defects in the vision of the patient after the latter has decided from what combination of lenses he can obtain the best vision on the test card I.

It is understood that I do not limit myself to any particular fastening devices for holding the instruments of vision D in position on the wheel C, as such devices may be varied without deviating from my invention. By the use of the notches and buttons the instruments of vision can be fastened on the side of the wheel thus enabling the patient to stand at the side of the apparatus and have his eyes tested for distance on test cards fastened at a predetermined distance from the apparatus. In order to make this possible the eye-piece must be pivoted so that it will be parallel with the lenses on the side of the apparatus.

Having thus described my invention, I claim as new and desire to secure by Letters Patent:

1. An apparatus of the class described, comprising a revoluble wheel consisting of a pair of spaced arms, a test card holder adjustably located intermediate the peripheral face and the axis of the wheel, and a stationary eye-piece extending across the peripheral face of the wheel, the test card and the eye-piece being in the same line of vision.

2. An apparatus of the class described, comprising a revoluble wheel having a pair of spaced rims, an adjustable holder for a test card mounted on the axis thereof and arranged intermediate the axis of the wheel and the spaced rims thereof, and a fixed eye-piece extending across the said rims and having openings intermediate the rims, the said openings and the said test card being in the same line of vision.

3. An apparatus of the class described, comprising a revoluble wheel consisting of a pair of spaced rims, said rims provided with means for singly holding instruments of vision and arranged to hold the lenses of the instruments approximately tangentially and clear of the peripheral face of the wheel, a test card holder adjustably disposed intermediate the periphery and the axis of the wheel, and a fixed eye-piece with which the instruments are adapted to register on turning the wheel, the eye-piece extending across the periphery of the wheel and parallel to the test card and the instrument in register at the time with the eye-piece.

4. An apparatus of the class described, comprising a stand having a fixed axle, a wheel having a pair of spaced rims mounted to turn on the said axle, a test card holder adjustably mounted on the said axle and adapted to hold a test card approximately parallel to the axle, means for holding instruments of vision on the said rims and with the lenses of the instruments intermediate the said rims and tangential thereto, and an eye-piece extending across the peripheral face of the rims and approximately parallel to the said test card, the said eye-piece having a supporting arm fixed on the said axle and the said eye-piece having openings intermediate the said wheel rims and adapted to register with the lenses of any one of the said instruments of vision on rotating the wheels.

5. An apparatus of the class described, comprising a stand having a fixed axle, a wheel having a pair of spaced rims mounted to turn on the said axle, said rims having notches in their edges, a test card holder adjustably mounted on the said axle and adapted to hold a test card approximately parallel to the axle and intermediate the axle and periphery of the wheel, means for holding instruments of vision in the notches on the said rims and with the lenses of the instruments intermediate the said rims and tangential thereto, and an eye-piece extending across the peripheral faces of the rims and approximately parallel to the said test card, the said eye-piece having a supporting arm fixed on the said axle and the said eye-piece having spaced rotatable graduated collars, the openings of which are intermediate the said wheel rims and are adapted to register with the lenses of any one of the instruments of vision on rotating the wheel, and the said collars having holders for the reception of testing lenses.

6. An apparatus of the class described comprising a revoluble wheel having spaced rims, means for removably securing instruments of vision to the periphery of the rims and between the same, a test card holder located within said wheel, an arm secured to the axle of the wheel and extending beyond the periphery thereof, and a stationary eyepiece secured to said arm extending across the peripheral face of the wheel, in the same line of vision with the test card in the holder.

In testimony whereof I have signed my name to this specification in the presence of two subscribing witnesses.

DANIEL D. SULLIVAN.

Witnesses:
G. E. NICHOLS,
A. B. TAYLOR.

Copies of this patent may be obtained for five cents each, by addressing the "Commissioner of Patents, Washington, D. C."